United States Patent
Ugazio et al.

(10) Patent No.: US 12,084,597 B2
(45) Date of Patent: Sep. 10, 2024

(54) AMINO-FUNCTIONAL POLYORGANOSILOXANE ADDITIVE FOR AQUEOUS COATING COMPOSITIONS

(71) Applicant: Dow Silicones Corporation, Midland, MI (US)

(72) Inventors: Stephane Ugazio, Seneffe (BE); Sophie Hanssens, Seneffe (BE); Pierre Leger, Seneffe (BE)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 18/568,870

(22) PCT Filed: Jul. 11, 2022

(86) PCT No.: PCT/US2022/073584
§ 371 (c)(1),
(2) Date: Dec. 11, 2023

(87) PCT Pub. No.: WO2023/039315
PCT Pub. Date: Mar. 16, 2023

(65) Prior Publication Data
US 2024/0270988 A1 Aug. 15, 2024

Related U.S. Application Data

(60) Provisional application No. 63/241,119, filed on Sep. 7, 2021.

(51) Int. Cl.
| | | |
|---|---|---|
| *C09D 7/00* | (2018.01) | |
| *C08G 77/26* | (2006.01) | |
| *C09D 7/61* | (2018.01) | |
| *C09D 7/65* | (2018.01) | |
| *C09D 133/08* | (2006.01) | |

(52) U.S. Cl.
CPC ............ *C09D 7/65* (2018.01); *C08G 77/26* (2013.01); *C09D 7/61* (2018.01); *C09D 133/08* (2013.01); *C08G 2150/00* (2013.01)

(58) Field of Classification Search
CPC .......... C09D 7/65; C09D 7/61; C09D 133/08; C08G 77/26; C08G 2150/00
USPC ....................................................... 106/218
See application file for complete search history.

(56) References Cited

U.S. PATENT DOCUMENTS

| | | |
|---|---|---|
| 2,947,771 A | 8/1960 | Bailey |
| 4,246,029 A | 1/1981 | Sanders, Jr. |
| 4,247,592 A | 1/1981 | Kalinowski |
| 4,509,981 A | 4/1985 | Sanders, Jr. et al. |
| 4,661,577 A | 4/1987 | Jo Lane et al. |
| 6,291,021 B1 | 9/2001 | Morita et al. |
| 6,602,949 B2 | 8/2003 | Furukawa et al. |
| 6,656,598 B2 | 12/2003 | Kudo et al. |
| 7,238,768 B2 | 7/2007 | Hupfield et al. |
| 7,579,395 B2 | 8/2009 | Gottlieb |
| 8,877,844 B2 | 11/2014 | Andrews |
| 8,980,995 B2 | 3/2015 | Yang et al. |
| 9,102,848 B2 | 8/2015 | Hamilton et al. |
| 10,119,040 B2 | 11/2018 | Rohm et al. |
| 10,245,451 B2 | 4/2019 | Bouzeloc et al. |
| 10,538,675 B2 | 1/2020 | Pastena et al. |
| 10,723,908 B2 | 7/2020 | Sandoval et al. |
| 11,028,229 B2 | 6/2021 | Suthiwangcharoen et al. |
| 2005/0148752 A1 | 7/2005 | Klaassens et al. |
| 2012/0220705 A1 | 8/2012 | Hamilton et al. |
| 2014/0213717 A1 | 7/2014 | Andrews et al. |
| 2016/0235656 A1* | 8/2016 | Herrlein ................ A61Q 5/065 |
| 2021/0238423 A1* | 8/2021 | Conner ................... C08L 25/14 |

FOREIGN PATENT DOCUMENTS

WO  2019060614  3/2019

OTHER PUBLICATIONS

Coatings and Inks Additive Selection guide (Dow 2019).
Coatings Formulation Guide—An Overview of Dow's Capabilities and Recommendations in Several Coating Formulations (Dow 2020).
Dowsil™ 904H Coating Additive—Technical Data Sheet (Dow 2017).
Dowsil™ 904H Coating Additive for Architectural Façade Coatings (Dow 2018).
Primal™ AC-337—Technical Data Sheet (Dow).
Primal™ SF-016—Technical Data Sheet (Dow).

* cited by examiner

*Primary Examiner* — James E McDonough
(74) *Attorney, Agent, or Firm* — Edward W. Black

(57) ABSTRACT

An aqueous coating composition including: a) pigment, b) binder, c) surfactant and d) an amino-functional polyorganosiloxane including at least one pendant amino group.

9 Claims, No Drawings

AMINO-FUNCTIONAL POLYORGANOSILOXANE ADDITIVE FOR AQUEOUS COATING COMPOSITIONS

CROSS REFERENCE TO RELATED APPLICATIONS

This application is a U.S. national stage filing under 35 U.S.C. § 371 of PCT Application no. PCT/US2022/073584 filed on 11 Jul. 2022, which claims the benefit of U.S. Provisional Patent Application Ser. No. 63/241,119 filed on 7 Sep. 2021 under 35 U.S.C. § 119 (e), both of which are hereby incorporated by reference.

FIELD

The present invention is directed toward amino-functional polyorganosiloxane additives useful for reducing surfactant leaching in aqueous coating compositions used in both interior and exterior applications.

INTRODUCTION

"Snail trail" is a common visual effect observed after applying aqueous coating compositions to a substrate. The effect manifest itself as a series of vertical lines or "trails" that appear upon the coating after partial drying. The effect is particularly noticeable when using compositions having a high percent Pigment Volume Concentrations (% PVC). Snail trail is believed to be caused by surfactants and other water soluble constituents leaching out of the coating. Past efforts to reduce surfactant leaching include the use of "reactive" surfactants that become bound to other constituents of the composition. See for example U.S. Pat. No. 9,102,848. Another approach involves the use of carbosiloxane dendrimer-grafted vinyl copolymers as described in WO2019/060614. Yet another approach includes the addition of DOWSIL™ 904H Coating Additive—an alkoxy(3-aminopropyl)siloxy-terminated polydimethylsiloxane fluid, to the aqueous coating composition. The industry continues to seek improved technical solutions for reducing surfactant leaching in aqueous coating compositions.

SUMMARY

The inventors of the present invention discovered an unexpected reduction in snail trail when formulating aqueous coating compositions with a certain class of amino-functional polyorganosiloxanes. In particular, the inventors discovered that the inclusion of amino-functional polyorganosiloxanes including amino groups located at pendent positions along the polysiloxane backbone resulted in a significant reduction in snail trail as compared with corresponding amino-functional polyorganosiloxanes including amino groups located solely at terminal positions.

The present invention includes aqueous coating compositions including the aforementioned amino-functional polyorganosiloxanes along with their preparation and use. Many embodiments are described.

In one aspect, the present invention includes an aqueous coating composition including: a) pigment, b) binder, c) surfactant and d) an amino-functional polyorganosiloxane having a molecular weight (Mw) of from 10,000 to 50,000 AMU (Daltons) and wherein said amino-functional polyorganosiloxane comprises at least one pendant amino group. In another aspect the amino-functional polyorganosiloxane has an amino neutral equivalent (ANE) number of from 1000 to 8000.

DETAILED DESCRIPTION

As used herein, the term "aqueous coating composition" refers to water-based (also referred to as "waterborne") architectural, industrial and wood coatings used in both interior and exterior applications. Such coating compositions include an aqueous mixture of: a) pigment, b) binder and c) surfactant. As is common in the industry, such coatings may optionally include additional constituents such as: fillers, rheology modifiers, wetting agents, dispersants, defoamers, preservatives, coalescing agents, pH stabilizers and extenders. As is known in the art, many of the individual constituents may have overlapping functions, e.g. dispersants and surfactants. Pigments, fillers, binders and surfactants are described in more detail below. Representative examples of other constituents include: Rheology Modifiers: ACRYSOL™ RM-8W and ACRYSOL™ RM-2020, Dispersants: OROTAN™ 731A ER and TAMOL™ 1124, Defoamers: DOWSIL™ 108F, DOWSIL™ 8590 and DOWSIL™ 74; Coalescing agents: UCAR™ Filmer IBT and Texanol™ ester alcohol, and Extenders: ROPAQUE™ Ultra E Organic Opacifier, all available from The Dow Chemical Company. A typical aqueous coating composition includes the follow constituents (components) in the following quantities:

| Coating Component | Weight Percent |
| --- | --- |
| Water | 25-50 |
| Pigment | 10-20 |
| Fillers (if used) | 40-70 (including pigment and fillers) |
| Binders | 10-40 |
| Surfactant | 1-5 |
| Optional constituents | Total to make up 100 wt % |

The preparation of applicable aqueous coating compositions is not particularly limited and well known techniques may be used. Classic preparation techniques include two steps: i) pigment dispersion (so called "grinding") and ii) let-down. During the grinding step, clusters of pigment are ground to obtain a fine particle pigment dispersion. This operation may be carried out in a bead mill a high speed rate (e.g., ≥1200 rpm) until desired particle size is achieved. Grinding can be controlled by the measurement of Hegman fineness. Preferred particle sizes will vary depending upon the application but generally range from 0.3 to 5 μm as measured by laser diffraction using a Malvern 3000. Friction generated during the grinding process may raise the temperature of the system and as such, cooling may be necessary prior to initiating the let-down step to avoid degradation or alteration of subsequently added constituents. During the let-down step, the ground pigment (typically provided as a ground paste) is combined and mixed (e.g., with a mechanical mixer at a slow rate, e.g., from 500-1100 rpm) with an aqueous dispersion of the binder and surfactant along with any other optional constituents previously mentioned. The final viscosity of the resulting composition may be adjusted by adding additional water or rheology modifier (thickener). The specific order of addition and selection of individual constituent can be readily determined by routine experimentation.

In one class of embodiments, the aqueous coating compositions have a percent Pigment Volume Concentration (%

PVC) of at least 40 and more preferably at least 50. The term "percent Pigment Volume Concentration" or "% PVC" refers to the quantity calculated by the following formula: % PVC=(volume of pigment(s) along with any fillers and extenders if used) divided by the total dry volume of paint*100 a) Pigment

The class of applicable pigments for use in the present invention is not particularly limited and is preferably selected from inorganic pigments including one or more metal oxides such as titanium oxide, iron oxide, zinc oxide with titanium oxide being most preferred. Applicable commercial products include TiPure™ R-706 available from Chemours and TIOXIDE™ TR92 available from Huntsman. Less expensive materials such as calcium carbonate, clay, talc and mica may also be used and when used in combination with a metal oxide are commonly referred to as "fillers". Applicable commercial products include DURCAL™ 2 and DURCAL™ 2 available from Omya.

b) Binder

The class of applicable binders for use in the present invention is not particularly limited and is preferably selected from organic polymers. A preferred class of polymers may be prepared via polymerization (e.g. free-radical polymerization) of monoethylenically unsaturated organic monomers and multi-ethylenically unsaturated organic monomers. Such organic polymers include both homopolymers and copolymers. As used herein, a "monoethylenically unsaturated organic monomer" (preferably an α-monoethylenically unsaturated monomer) is a compound comprising a single polymerizable carbon-carbon double bond which under appropriate reaction conditions, is subject to free radical polymerization. Examples include monoethylenically unsaturated monocarboxylic acids, dicarboxylic acids and their corresponding esters. Representative "acrylates" include: methacrylates, substituted acrylates, substituted methacrylates, fluorinated acrylates and fluorinated methacrylates. Specific examples include acrylate esters and methacrylate esters such as methyl acrylate, ethyl acrylate, butyl acrylate, t-butyl acrylate, 2-ethylhexyl acrylate, methyl methacrylate, decyl acrylate, lauryl acrylate, isodecyl methacrylate, lauryl methacrylate, and butyl methacrylate; substituted acrylates and methacrylates such as hydroxyethyl acrylate, perfluorooctyl acrylate, hydroxypropyl acrylate, hydroxypropyl methacrylate, and hydroxyethyl methacrylate. Representative "acrylic acids" include: acrylic acid, methacrylic acid, ethylacrylic acid and corresponding salts thereof. Representative "vinyl halides" include: vinyl chloride, vinylidene chloride, and chloroprene. Additional examples of applicable monomers include: maleic anhydride, vinyl esters such as vinyl acetate and vinyl butyrate; vinyl pyrrolidone; conjugated dienes such as butadiene and isoprene; vinyl aromatic compounds such as styrene and divinyl benzene; vinyl monomers such as ethylene; acrylonitrile and methacrylonitrile; acrylamide, methacrylamide, and N-methylol acrylamide; and vinyl esters of monocarboxylic acids with up to 10 carbon atoms. A preferred class of organic binders are selected from polymers derived from acrylic acid and/or acrylate monomers, collectively referred to herein as "acrylics" or "acrylic-based polymers". As used herein, the terms "acrylic" and "acrylic-based polymers" includes both homo and copolymers (e.g., styrene-acrylic copolymers, vinyl acetate-propenoate ester copolymers, etc.). Commercial examples of such products include the PRIMAL™ brand of acrylic binders available from The Dow Chemical Company. Such binders are often provided as an aqueous emulsion including surfactant.

c) Surfactant

The class of applicable surfactants for use in preparing the subject compositions is not particularly limited and includes a wide range of commercially available materials. Preferred surfactants may be anionic, cationic, non-ionic, or mixtures thereof with non-ionic surfactants being preferred.

Examples of applicable anionic surfactants include, but are not limited to, alkali metal, amine, or ammonium salts of higher fatty acids, alkylaryl sulphonates such as sodium dodecyl benzene sulfonate, long chain fatty alcohol sulfates, olefin sulfates and olefin sulfonates, sulfated monoglycerides, sulfated esters, sulfonated ethoxylated alcohols, sulfosuccinates, alkane sulfonates, phosphate esters, alkyl isethionates, alkyl taurates, alkyl sarcosinates, and mixtures thereof. Further examples of applicable anionic surfactants include carboxylates (sodium 2-(2-hydroxyalkyloxy) acetate)), amino acid derivatives (N-acylglutamates, N-acylgly-cinates or acylsarcosinates), alkyl sulfates, alkyl ether sulfates and oxyethylenated derivatives thereof, sulfonates, isethionates and N-acylisethionates, taurates and N-acyl N-methyltaurates, sulfosuccinates, alkylsulfoacetates, phosphates and alkyl phosphates, polypeptides, anionic derivatives of alkyl polyglycoside (acyl-D-galactoside uronate), and fatty acid soaps, and mixtures thereof. Commercial examples of applicable anionic surfactants include: POLYSTEP™ B25-E from Stepan, MARLON™ A 323 from Sasol and HOSTAPUR™ SAS 30 from Clariant.

Examples of applicable nonionic surfactants include, but are not limited to, condensates of ethylene oxide with long chain fatty alcohols or fatty acids such as a $C_{12-16}$ alcohol, condensates of ethylene oxide with an amine or an amide, condensation products of ethylene and propylene oxide, esters of glycerol, sucrose, sorbitol, fatty acid alkylol amides, sucrose esters, fluoro-surfactants, fatty amine oxides, and mixtures thereof. Further examples of nonionic surfactants include polyoxy-ethylene fatty alcohols such as polyoxyethylene (23) lauryl ether, polyoxyethylene (4) lauryl ether; ethoxylated alcohols such as ethoxylated trimethylnonanol, $C_{12}$-$C_{14}$ secondary alcohol ethoxylates, ethoxylated, C10-Guerbet alcohol, ethoxylated, iso-C13 alcohol; poly(oxyethylene)-poly(oxypropylene)-poly(oxyethylene) tri-block copolymer (also referred to as poloxamers); tetrafunctional poly(oxyethylene)-poly(oxypropylene) block copolymer derived from the sequential addition of propylene oxide and ethylene oxide to ethylene diamine (also referred to as poloxamines), silicone polyethers, polyoxyethylene alkyl ethers, polyoxyethylene alkylphenol ethers, polyoxyethylene lauryl ethers, polyoxyethylene sorbitan monoleates, polyoxyethylene alkyl esters, polyoxy-ethylene sorbitan alkyl esters, polyethylene glycol, polypropylene glycol, diethylene glycol, ethoxylated trimethylnonanols, and polyoxyalkylene glycol modified polysiloxane surfactants, and combinations thereof. Further examples of applicable nonionic surfactants include polyoxyethylene alkyl ethers, polyoxyethylene alkylphenol ethers, polyoxyethylene lauryl ethers, straight-chain, primary alcohol alkoxylates, straight-chain secondary alcohol alkoxylates, alkyl phenol alkoxylates, olefinic alkoxylates, branched chain alkoxylates, polyoxyethylene sorbitan monoleates, polyoxyethylene alkyl esters, polyoxyethylene sorbitan alkyl esters, polyethylene glycol, polypropylene glycol, diethylene glycol, ethoxylated trimethylnonanols, polyoxyalkylene-substituted silicones (rake or ABn types), silicone alkanolamides, silicone esters, silicone glycosides, and mixtures thereof. Additional examples of applicable nonionic surfactants include dimethicone copolyols, fatty acid esters of polyols, for instance sorbitol or glyceryl mono-, di-, tri- or sesquioleates or stearates, glyceryl or polyethylene glycol laurates; fatty acid esters of polyethylene glycol (polyethylene glycol monostearate or monolaurate); polyoxyethylenated fatty acid esters (stearate or oleate) of sorbitol; polyoxyethylenated alkyl (lauryl, cetyl, stearyl or octyl) ethers. Examples of applicable commercial non-ionic surfactants include: TERGITOL™ TMN-10 available from The Dow Chemical Company, ADUXOL™ TRD6 available from Sharer & Schlapfer AG, and BRIJ™ L23 and BRIJ™ LT3 both available from Croda.

d) Amino Silicone

The class of applicable amino-functional polyorganosiloxanes ("amino silicone") for use in preparing the subject compositions is not particularly limited and includes commercially available materials. Importantly, the subject amino silicones include at least one amino group located at a pendant position along the polysiloxane backbone. As demonstrated in the Examples below, amino silicones including amino groups located at pendant positions performed superior to those with amino groups located solely at terminal positions. And while the subject amino silicones may include amino groups located at both terminal and pendant positions, in a preferred class of embodiments the amino groups are predominately located at pendant positions, i.e. greater than 90 wt % and more preferably greater than 95 wt %, and still more preferably greater than 99 wt % of the amino groups are located at pendant positions as determined by $^{29}$Si NMR. Such polymers include linear and branched structures with linear polymers being preferred. Applicable polymers preferably have a weight average molecular weight (Mw) of 10,000 to 50,000 AMU (Daltons), more preferably from 12,000 to 45,000 AMU and still more preferably from 15,000 to 40,000 AMU (Daltons). Applicable polymers preferably have viscosities of from 500 to 10,000 cSt, more preferably 700 to 7000 cSt, as measured at 25° C. according to ASTM D1084-16(2021). The subject amino silicones preferably have an amino neutral equivalent (ANE) value of from 1000 to 8000 and more preferably 1000 to 7000 as determined by ASTM D2074-07. This test method provides the total amine value which may be converted to the more commonly reported amino neutral equivalent (ANE) according to the following calculation: amino neutral equivalence=(1000*56.1)/(total amine value). Different amino silicones may be used in combination, e.g. those having different chemical structures, molecular weights and/or viscosities. Applicable techniques for preparing amino silicones are well known. See for example: U.S. Pat. Nos. 11,028,229, 10,245,451, 7,238,768 and 2,947,771. Representative amino silicones include those of the general formula:

$R_3SiO[R_2SiO]_x[RR^NSiO]_ySiR_3$ where "x" is 100 to 500, preferably 200 to 300; "y" is 1 to 10, preferably 2 to 8 and "R" may be the same or different and is selected from substituted or unsubstituted monovalent hydrocarbon groups having from 1 to 18 carbon atoms and more preferably from 1 to 8 carbon atoms. Representative hydrocarbon groups include: a) alkyl groups such as: methyl, ethyl, propyl, butyl, pentyl, hexyl, cyclohexyl and heptyl; b) aryl groups such as phenyl, tolyl, xylyl and naphthyl; and c) aralkyl groups such as benzyl and phenethyl; however methyl and phenyl groups are preferred with methyl being most preferred. Representative substituents include hydroxyl, amino and alkoxy. "$R^N$" is an amino group including one or more (preferably one to three) primary or secondary amine groups each including 1 to 6 carbon atoms. Representative amino groups include those of the general formula:

—R'NR"R"

where R' is a divalent hydrocarbon group (e.g. an alkylene group) having from 2 to 6 carbon atoms and R" is the same or different and is selected from H (hydrogen) or a monovalent hydrocarbon group (e.g. an alkyl group) having from 1 to 6 carbon atoms which may be unsubstituted, or substituted with i) one or more unsubstituted or substituted hydrocarbon groups, ii) primary amine groups and secondary amine groups including a unsubstituted or substituted monovalent hydrocarbon group (e.g. an alkyl group) having form 1 to 6 carbon atoms. Applicable substituents include hydroxyl and alkoxy (e.g. methoxy, ethoxy). Representative, non-limiting examples of "$R^N$" groups include: $(CH_3O)_2(CH_3)Si(CH_2)_3NH_2$, $(CH_3O)_2(CH_3)Si(CH_2)_4NH_2$, $(CH_3O)_2(CH_3)Si(CH_2)_3NH(CH_2)_2NH_2$, $(CH_3O)_2(CH_3)SiCH_2CH(CH_3)CH_2NH(CH_2)_2NH_2$, $(CH_3O)_2(CH_3)SiCH_2CH(CH_3)CH_2NH(CH_2)_3NH_2$, $(CH_3O)_2(CH_3)Si(CH_2)_3NH(CH_2)_2NH(CH_2)_2NH_2$, $(CH_3O)_2(CH_3)Si(CH_2)_3NH(CH_2)_4NH_2$ and their corresponding ethoxy ($C_2H_5O$) silanes.

The subject amino silicones are preferable provided as an aqueous emulsion with a non-ionic surfactant such as those previously described. The emulsion preferably includes from 1 to 5 wt % and more preferably from 1 to 4 wt % of non-ionic surfactant. Preferred emulsions include from 40 to 70 wt % of the subject amino silicone. When provided as such, the emulsion may be used as an "additive" to an existing aqueous coating composition (as described in the Examples below) or included during the let-down step as previously described. Thus, in one embodiment, the invention includes a method of making an aqueous coating composition having improved resistance to snail trail including the steps of either preparing or acquiring an aqueous coating composition as described above and adding an aqueous emulsion of the subject amino silicone. The amino silicone emulsion is preferably added to the aqueous coating composition in a quantity to provide from 1 to 10 and preferably 2 to 5% active. As used herein "% active" refers to the weight percent of the additive in the aqueous coating composition excluding water. Once added, the resulting coating composition is very stable and can be stored for extended time periods without settling of the subject amino silicone.

Silanol

While not required nor even desired in most embodiments, the subject compositions may include one or more polyorganosiloxanes including at least one silanol group ("silanol"). When used, silanols may be combined with the aforementioned amino silicone and surfactant as part of an aqueous emulsion added to an aqueous coating composition including the aforementioned pigment, binder and surfactant. In one class of embodiments, the subject aqueous coating compositions are substantially free of silanols. In this context, the term "substantially free" means less than 0.5 wt %, preferably less 0.1 wt % and more preferably less than 0.01 wt % and still more preferably less than 0.001 wt %, based upon the total weight of the aqueous coating composition. In another class of embodiments, silanol is included in the subject aqueous coating composition in weight ratio to the amino silicone (silanol:amino silicone) of ≤30:70 and more preferably ≤10:90, and still more preferably ≤5:95. If used, the class of silanols is not particularly limited and includes a wide range of commercially available materials. Such materials include linear and branched structures with linear polymers being preferred. Applicable polymers preferably have a weight average molecular weight (Mw) of 2000 to 60,000 AMU (Daltons). Applicable polymers may have viscosities of from 50 to 5000 cSt as measured at 25° C. according to ASTM D1084-16(2021). Different silanols may be used in combination, e.g. those having different chemical structures, molecule weights and/or viscosities. The subject polysiloxanes include at least one (—SiOH) groups which may be located on the polysiloxane backbone at terminal (end) and/or intermediate (pendant) positions.

Many embodiments of the invention have been described and, in some instances, certain embodiments, selections, ranges, constituents, or other features have been characterized as being "preferred." Such designations of "preferred" features should in no way be interpreted as an essential or critical aspect of the invention. Expressed ranges specifically include designated end points. As used herein, the terms "molecular weight" and "Mw" refer to the weight average molecular weight as measured by gel permeation chromatography (GPC). Particle size measurements were determined by laser diffraction using a Malvern 3000.

EXAMPLES

Unless otherwise indicated, all preparation and testing were conducted at room temperature (RT) at standard pressure (1 atm or 760 mm Hg) and all percentages are expressed as weight percent.

Four sample aqueous coating formulations were prepared as described below and one sample was acquired (i.e. Jotashield Colourlast from Jotun). Aqueous emulsions of various additive formulations were then mixed into each sample aqueous coating composition as described below and then tested according to D7190-10(2015). In particular, each sample coating composition was applied upon a black scrub panel (P121-10N plastic-Vinyl Chloride/Acetate Copolymer paper), at 200 μm wet thickness with a metal gap applicator and left to dry for 8 to 24 hours. Three water drops were then applied to each coated panel and allowed to stand for 30 minutes, after which the panel was tipped to remove the water. Traces left by the water on the panel after evaporation were then assessed according to Test A-E as provided below. A combination of ratings for Tests A-E is most indicative of performance.

| Test | Measurement | Criteria |
|---|---|---|
| A | Drop area on paint - color change | Color change |
| B | Drop area on paint - bordering | Gloss increase |
| C | Run down on paint | Gloss increase |
| D | Run down on uncoated substrate | White traces |
| E | Compatibility | Orange peel |

Ratings were assessed according to the following criteria:

| Rating | Criteria |
|---|---|
| 1 | Low level of change; no visual snail trail present |
| 2 | Medium level of change; snail trail is apparent, not ideal but acceptable for some applications |
| 3 | High level of change; significant snail trail is apparent, unacceptable for most applications |

50% PVC formulation:

| Material | Description | Kilograms |
|---|---|---|
| Grind Step | | |
| Water | Continuous phase | 11.75 |
| TAMOL ™ 1124 | Dispersant | 0.62 |
| DOWSIL ™ 8590 | Defoamer | 0.03 |
| TiPure ™ R-706 | Pigment (TiO$_2$) | 16.63 |
| DURCAL ™ 5 | Filler (CaCO$_3$) | 9.32 |
| DURCAL ™ 2 | Filler (CaCO$_3$) | 15.02 |
| End Grind | | 53.37 |
| Let-Down Step (add the following constituents to End Grind with mixing) | | |
| PRIMAL ™ SF-016 | Binder | 29.1 |
| Ammonia (28%) | Neutralizing Agent | 0.04 |
| DOWSIL ™ 108F | Defoamer | 0.16 |
| ACRYSOL ™ RM-8W | Rheology Modifier | 0.55 |
| ACRYSOL ™ RM-2020 NPR | Rheology Modifier | 1.18 |
| Water | Continuous phase | 15.6 |
| End Let-Down | | 46.63 |
| Final | | 100 |

55% PVC formulation:

| Name | Description | Kilograms |
|---|---|---|
| Grinding Step | | |
| Water | Continuous phase | 121.4 |
| Cellosize ™ QP-4400H | Rheology Modifier | 2.2 |
| Ammonia (28%) | Neutralizing Agent | 0.83 |
| DOWSIL ™ 108F | Defoamer | 3.02 |
| Orotan ™ 731 A ER | Dispersing agent | 17.61 |
| Tioxide ™ TR92 | Pigment (TiO$_2$) | 94.32 |
| DURCAL ™ 5 | Filler (CaCO$_3$) | 138.67 |
| DURCAL ™ 2 | Filler (CaCO$_3$) | 194.37 |
| End Grind | | 572.42 |
| Let-Down Step (add the following constituents to End Grind with mixing) | | |
| PRIMAL ™ AC-337 | Binder | 292.26 |
| Water | Continuous phase | 116.37 |
| UCAR ™ Filmer IBT | Coalescing agent | 10.89 |
| DOWSIL ™ 108F | Defoamer | 1.1 |
| ACRYSOL ™ RM-5000 | Rheology Modifier | 5.36 |
| ACRYSOL ™ RM-845 | Rheology Modifier | 1.61 |
| End Let-Down | | 427.59 |
| Final | | 1000.01 |

60% PVC formulation:

| Name | Description | Kilograms |
|---|---|---|
| Grinding Step | | |
| Water | Continuous phase | 81.60 |
| DOWSIL ™ 8590 | Defoamer | 1.11 |
| Tamol ™ 1124 | Dispersing agent | 8.10 |
| Ti-Pure ™ R-706 | Pigment (TiO$_2$) | 87.11 |
| DURCAL ™ 5 | Filler (CaCO$_3$) | 195.50 |
| DURCAL ™ 2 | Filler (CaCO$_3$) | 132.11 |
| End Grind | | 505.53 |
| Let-Down Step (add the following constituents to End Grind with mixing) | | |
| PRIMAL ™ AC-261K | Binder | 210.51 |
| Water | Continuous phase | 170.86 |
| Ammonia (28%) | Neutralizing Agent | 1.11 |

-continued

| Name | Description | Kilograms |
|---|---|---|
| Texanol ™ ester alcohol | Coalescing agent | 8.42 |
| DOWSIL ™ 108F | Defoamer | 2.22 |
| ACRYSOL ™ RM-8W | Rheology Modifier | 6.79 |
| ACRYSOL ™ RM-2020 | Rheology Modifier | 14.56 |
| End Let-Down | | 414.474 |
| Final | | 920.004 |

76% PVC formulation:

| Name | Description | Kilograms |
|---|---|---|
| Grinding Step | | |
| Water | Continuous phase | 152.45 |
| Cellosize ™ QP-4400H | Rheology Modifier | 2.76 |
| Ammonia (28%) | Neutralizing Agent | 1.04 |
| DOWSIL ™ 108F | Defoamer | 3.79 |
| Orotan ™ 731 A ER | Dispersing agent | 22.11 |
| Tioxide ™ TR92 | Pigment (TiO2) | 118.44 |
| DURCAL ™ 5 | Filler (CaCO3) | 174.14 |
| DURCAL ™ 2 | Filler (CaCO3) | 244.07 |
| End Grind | | 718.8 |
| Let-Down Step (add constituents to End Grind with mixing) | | |
| PRIMAL ™ AC-337 | Binder | 141.29 |
| Water | Continuous phase | 124.53 |
| UCAR ™ Filmer IBT | Coalescing agent | 5.25 |
| DOWSIL ™ 108F | Defoamers | 1.39 |
| ACRYSOL ™ RM-5000 | Rheology Modifier | 6.73 |
| ACRYSOL ™ RM-845 | Rheology Modifier | 2.02 |
| End Let-Down | | 281.21 |
| Final | | 1000.01 |

Materials used in preparing aqueous emulsions of various additive formulations:

A series of aqueous emulsions additive formulations as indicated below were prepared and mixed (at the designated % active) into the indicated aqueous coating formulations and subsequent tested. Results are provided below. As used herein "% active" refers to the weight percent of the additive excluding water.

Example 1

This series of examples demonstrates the improved performance resulting from the addition of the subject amino silicone (no. 2, 3 and a blend of 2 and 3) as compared with a control example including no such additive.

Test in 76% PVC formulation (5% active)

| | Control Ex. | Ex. 1 | Ex. 2 | Ex. 3 | Ex. 4 | Ex. 5 |
|---|---|---|---|---|---|---|
| Amino silicone no. | | 3 | 2 | 3 | 3 | 3/2 |
| Wt. ratio | | — | — | — | — | 90/10 |
| Amino silicone (wt %) | | 60.00 | 60.00 | 60.00 | 60.00 | 60 (54/6) |
| Tergitol ™ TMN10 (wt %) | | 1.20 | 1.20 | 2.00 | 2.00 | 2.00 |
| Water (wt %) | | 38.80 | 38.80 | 38.00 | 38.00 | 38.00 |
| Total (wt %) | 0 | 100.00 | 100.00 | 100.00 | 100.00 | 100.00 |
| $DV_{0.5}$ (µm) | | 0.83 | 1.04 | 0.57 | 2.50 | 0.87 |
| Evaluation | | | | | | |
| A | 3 | 1 | 1 | 2 | 2 | 2 |
| B | 3 | 1 | 1 | 1 | 1 | 1 |
| C | 3 | 1 | 1 | 2 | 2 | 2 |
| D | 3 | 1 | 1 | 2 | 3 | 2 |
| E | 3 | 1 | 1 | 1 | 3 | 2 |

| Material | Name | Chemical Description | Properties | Source |
|---|---|---|---|---|
| Amino silicone | Amino No. 1 | Amino-functional polyorganosiloxane | MW = 16100; ANE = 2040; $C_{14}$-$C_{15}$ hydrocarbon terminated; Pendant diamine | Dow |
| Amino silicone | Amino No. 2 | Amino-functional polyorganosiloxane | Mw = 20800; ANE = 4019 ethoxy terminated; Pendant monoamine | Dow |
| Amino silicone | Amino No. 3 | Amino-functional polyorganosiloxane | Mw = 35500; ANE = 6847; methoxy terminated, Pendant diamine | Dow |
| Amino silicone | Amino No. 4 | Amino-functional polyorganosiloxane | Mw = 21100; ANE = 1698; Pendant diamine | Dow |
| Amino silicone | Amino No. 5 | Amino-functional polyorganosiloxane | Mw = 17600; ANE = 3396; Pendant diamine | Dow |
| Amino silicones with amine groups located solely at terminal positions: | | | | |
| Amino silicone | Amino No. 6 | Amino-functional polyorganosiloxane | Mw = 17900; ANE = 8971; Terminal monoamine | Dow |
| Amino silicone | Amino No. 7 | Amino-functional polyorganosiloxane | Mw = 8600; ANE = 4288; Terminal diamine | Dow |
| Amino silicone | DOWSIL ™ 904H Coating Additive | Amino-functional polyorganosiloxane | Mw = 3200; ANE = 1918; Terminal diamine | Dow |
| Silanol | Silanol No. 1 | OH end-blocked PDMS | Mw = 22000, (2000 cSt) | Dow |
| Silanol | Silanol No. 2 | OH end-blocked PDMS | Mw = 55570 (3500-4500 cSt) | Dow |
| Silanol | Silanol No. 3 | OH end-blocked PDMS | Mw = 3000 (55-90 cSt) | Dow |
| Surfactant | Tergitol ™ TMN10 | Tri Methyl Nonyl Polyethylene glycol | | Dow |
| Surfactant | Tergitol ™ 15-S-15 | secondary alcohol ethoxylate, nonionic | | Dow |
| Surfactant | Tergitol ™ 15-S-15 | secondary alcohol ethoxylate, nonionic | | Dow |
| Surfactant | Tergitol ™ 15-S-40 | secondary alcohol ethoxylate, nonionic | | Dow |
| Surfactant | Brij ™ LT3 | Alkyl polyglycol ether | | Croda |
| Surfactant | Brij ™ L23 | Polyoxyl lauryl ether | | Croda |
| Surfactant | Aduxol ™ TRD-06 | Isotridecyl alcohol ethoxylated | | Sharer Schlapfer |

Example 2

This series of examples demonstrates the improved performance resulting from the addition of the subject amino silicones (no. 3 a blend of 3 and 2) as compared with a control example including no such additive.
Test in 60% PVC formulation (2.5% active)

|  | Control Ex. | Ex. 6 | Ex. 7 |
|---|---|---|---|
| Amino silicone no. |  | 3 | 3/2 |
| Wt. ratio |  | 100 | 90/10 |
| Amino silicone (wt %) |  | 60.00 | 60.00 (54.00/6.00) |
| Tergitol ™ TMN10 (wt %) |  | 2.00 | 2.00 |
| Water (wt %) |  | 38.00 | 38.00 |
| Total (wt %) | 0 | 100.00 | 100.00 |
| Dv0.5 (µm) |  | 0.74 | 0.87 |
| Evaluation |  |  |  |
| A | 3 | 2 | 2 |
| B | 3 | 1 | 1 |
| C | 3 | 2 | 2 |
| D | 3 | 2 | 2 |
| E | 3 | 3 | 2 |

Example 3

This series of examples demonstrates the effect of including silanols (no. 1 and 3) of different molecular weights in the additive formulation in addition to the subject amino silicone (no. 3).
Test in 55% PVC formulation at 2% active

|  | Ex. 8 | Ex. 9 | Ex. 10 | Ex. 11 | Ex. 12 |
|---|---|---|---|---|---|
| Type of fluid | Amino 3 | Amino 3/ Silanol 3 | Amino 3/ Silanol 3 | Amino 3/ Silanol 1 | Amino 3/ Silanol 1 |
| Wt. ratio | 0/100 | 30/70 | 50/50 | 30/70 | 50/50 |
| Silicone (wt %) | 60.00 | 60.00 | 60.00 | 60.00 | 60.00 |
| Tergitol ™ TMN10 (wt %) | 2.00 | 2.00 | 2.00 | 2.00 | 2.00 |
| Water (wt %) | 38.00 | 38.00 | 38.00 | 38.00 | 38.00 |
| Total % | 100.00 | 100.00 | 100.00 | 100.00 | 100.00 |
| DV0.5 (µm) | 0.74 | 0.31 | 0.29 | 1.82 | 1.65 |
| Evaluation |  |  |  |  |  |
| A | 1 | 2 | 2 | 3 | 3 |
| B | 1 | 2 | 2 | 3 | 3 |
| C | 1 | 2 | 3 | 3 | 3 |
| D | 1 | 2 | 3 | 3 | 3 |
| E | 1 | 1 | 2 | 2 | 1 |

Example 4

This series of examples demonstrates the effect of various weight ratios of silanol (no. 2) to the subject amino silicone (no. 2).
Test in 76% PVC formulation at 3% active

|  | Ex. 13 | Ex. 14 | Ex. 15 | Ex. 16 | Ex. 17 | Ex. 18 | Ex. 19 |
|---|---|---|---|---|---|---|---|
| Type of fluid | Amino 2/ Silanol 2 | Amino 2/ Silanol 2 | Amino 2/ Silanol 2 | Amino 2/ Silanol 2 | Amino 2/ Silanol 2 | Amino 2/ Silanol 2 | Amino 2/ Silanol 2 |
| Wt. ratio | 100/0 | 95/5 | 70/30 | 50/50 | 30/70 | 5/95 | 0/100 |
| Silicone (wt %) | 60.00 | 60.00 | 60.00 | 60.00 | 60.00 | 60.00 | 60.00 |
| Tergitol ™ TMN10 (wt %) | 2.00 | 2.00 | 2.00 | 2.00 | 2.00 | 2.00 | 2.00 |
| Water (wt %) | 38.00 | 38.00 | 38.00 | 38.00 | 38.00 | 38.00 | 38.00 |
| Total % | 100.00 | 100.00 | 100.00 | 100.00 | 100.00 | 100.00 | 100.00 |
| Evaluation |  |  |  |  |  |  |  |
| A | 1 | 1 | 1 | 1 | 2 | 2 | 3 |
| B | 1 | 1 | 2 | 2 | 3 | 3 | 3 |
| C | 1 | 1 | 2 | 2 | 3 | 3 | 3 |
| D | 1 | 1 | 2 | 2 | 3 | 3 | 3 |
| E | 1 | 1 | 1 | 1 | 1 | 1 | 1 |

Example 5

DOWSIL™ 904H Coating Additive is promoted for reducing snail trail in aqueous coating compositions. While effective if added to a coating composition just prior to application, this additive (amino silicone with terminal amino groups) is not provided as an emulsion and as such, its stability in the coating composition is too short for many applications. To improve stability, the Additive should be incorporated into the coating composition as an emulsion. However, emulsion preparation of 904H requires much higher levels of surfactant than the subject amino silicones. This added surfactant leads to increase surfactant leaching. While not wishing to be bound by theory, it is believed that the relatively low molecular weight of the amino silicone species in 904H (3200 AMU) facilitates migration within the coating composition, which in turn interferes with surfactant also present in the composition. As shown by the results below, DOWSIL™ 904H Coating Additive provided no improvement over a control example including no amino silicone additive.

Test in 55% PVC formulation at 3% active

|  | Control Ex. | Ex. 20 (DOWSIL ™ 904H Coating Additive |
| --- | --- | --- |
| Silicone (wt %) |  | 67.80 |
| Aduxol ™ TRD6 |  | 22.03 |
| Water (wt %) |  | 10.17 |
| Total % | 0 | 100.00 |
| Evaluation | | |
| A | 3 | 3 |
| B | 3 | 3 |
| C | 3 | 3 |
| D | 3 | 3 |
| E | 3 | 3 |

Example 6

This series of examples demonstrates the effect of the location of the amino group (pendant vs. terminal) of the amino silicone.
Test in 76% PVC formulation at 3% active

|  | Ex. 21 | Ex. 22 | Ex. 23 (comparative) | Ex. 24 |
| --- | --- | --- | --- | --- |
| Amino silicone no. | 5 | 2 | 6 | 4 |
| Amino location | Pendant | Pendant | Terminal | Pendant |
| Silicone (wt %) | 60 | 60 | 60 | 60 |
| Tergitol ™ TMN10 (wt %) | 4 | 4 | 4 | 4 |
| Water (wt %) | 36 | 36 | 36 | 36 |
| Total % | 100.00 | 100.00 | 100.00 | 100.00 |
| Dv0.5 (µm) | 0.10 | 0.46 | 0.43 | 0.92 |
| Evaluation | | | | |
| A | 1 | 1 | 2 | 1 |
| B | 1 | 1 | 2 | 1 |
| C | 1 | 1 | 2 | 1 |
| D | 1 | 2 | 1 | 1 |
| E | 1 | 1 | 1 | 1 |

Test in 76% PVC formulation at 3% active

|  | Ex. 25 (comparative) | Ex. 26 (comparative) | Ex. 27 | Ex. 28 |
| --- | --- | --- | --- | --- |
| Amino silicone no. | 7 | 6 | 4 | 5 |
| Amino location | Terminal | Terminal | Pendant | Pendant |
| Silicone (wt %) | 60 | 60 | 60 | 60 |
| Tergitol ™ TMN10 (wt %) | 2.1 | 2.1 | 2.1 | 2.1 |
| Tergitol ™ 15S15 (wt %) | 4.9 | 4.9 | 4.9 | 4.9 |
| Water (wt %) | 33 | 33 | 33 | 33 |
| Total % | 100.00 | 100.00 | 100.00 | 100.00 |
| Dv0.5 (µm) | 0.08 | 0.10 | 2.59 | 7.46 |
| Evaluation | | | | |
| A | 3 | 3 | 2 | 2 |
| B | 3 | 3 | 1 | 2 |
| C | 3 | 3 | 2 | 2 |
| D | 3 | 3 | 2 | 3 |
| E | 1 | 1 | 1 | 2 |

Example 7

This series of examples demonstrates the effect of using of a variety of different surfactants with the subject amino silicone (no. 2).

Test in 76% PVC formulation at 3% active

|  | Ex. 29 | Ex. 30 | Ex. 31 |
| --- | --- | --- | --- |
| Amino silicone no. | 2 | 2 | 2 |
| Silicone (wt %) | 60.00 | 60.00 | 60.00 |
| Tergitol ™ TMN10 (wt %) | 2 | | |
| Tergitol ™ 15 S 5 (wt %) | | | 1 |
| Tergitol ™ 15 S 40 (wt %) | | | 1 |
| Brij ™ LT3 | | 1 | |
| Brij ™ LT23 | | 1 | |
| Water (wt %) | 38.00 | 38.00 | 38.00 |
| Total % | 100.00 | 100.00 | 100.00 |
| Dv0.5 (µm) | 0.99 | 1.04 | 1.78 |
| Evaluation | | | |
| A | 2 | 2 | 2 |
| B | 1 | 1 | 1 |
| C | 1 | 1 | 1 |
| D | 1 | 1 | 1 |
| E | 1 | 1 | 1 |

Example 8

This series of examples demonstrates the effect of adding the subject amino silicones (no. 1 and 5) to Jotashield Colourlast water-based paint (3% active) from Jotun as compared with a control example including no added amino silicone.
Jotashield Colourlast water-based paint at 3% active

|  | Ex. 32 | Ex. 33 | Control Ex. |
| --- | --- | --- | --- |
| Amino silicone no. | 5 | 1 | — |
| Silicone (wt %) | 60.00 | 60.00 | |
| Tergitol ™ TMN10 (wt %) | 2.00 | 2.00 | |
| Water (wt %) | 38.00 | 38.00 | |
| Total % | 100.00 | 100.00 | 0 |
| Dv0.5 (µm) | 3.62 | 0.50 | |
| Evaluation | | | |
| A | 1 | 1 | 3 |
| B | 1 | 1 | 3 |
| C | 1 | 1 | 3 |
| D | 1 | 1 | 3 |
| E | 1 | 1 | |

The invention claimed is:

1. An aqueous coating composition comprising: a) pigment, b) binder and c) surfactant, said composition being characterized by comprising: from 1 to 10% active of an amino-functional polyorganosiloxane having a molecular weight (Mw) of from 10,000 to 50,000 AMU (Daltons) and wherein said amino-functional polyorganosiloxane comprises at least one pendant amino group and wherein said amino-functional polyorganosiloxane has an amino neutral equivalent (ANE) value of from 1000 to 8000.

2. The coating composition of claim 1 wherein said pendant amino group is represented by at least one of the following formulae: $(CH_3O)_2(CH_3)Si(CH_2)_3NH_2$, $(CH_3O)_2(CH_3)Si(CH_2)_4NH_2$, $(CH_3O)_2(CH_3)Si(CH_2)_3NH(CH_2)_2NH_2$, $(CH_3O)_2(CH_3)SiCH_2CH(CH_3)CH_2NH(CH_2)_2NH_2$, $(CH_3O)_2(CH_3)SiCH_2CH(CH_3)CH_2NH(CH_2)_3NH_2$, $(CH_3O)_2(CH_3)Si(CH_2)_3NH(CH_2)_2NH(CH_2)_2NH_2$, $(CH_3O)_2(CH_3)Si(CH_2)_3NH(CH_2)_4NH_2$, and $(CH_3O)_2(CH_3)Si(CH_2)_3NH(CH_2)_2NH_2$.

3. The coating composition of claim 1 wherein said amino-functional polyorganosiloxane has a molecular weight (Mw) of from 12,000 to 45,000 AMU (Daltons).

4. The coating composition of claim 1 wherein the binder comprises an acrylic binder.

5. The coating composition of claim 1 wherein the pigment comprises a metal oxide.

6. The coating composition of claim 1 wherein the surfactant comprises a non-ionic surfactant.

7. The coating composition of claim 1 further characterized by having a percent Pigment Volume Concentration (% PVC) of at least 50%.

8. The coating composition of claim 1 further characterized by comprising a polyorganosiloxane including at least one silanol group in a weight ratio to said amino-functional polyorganosiloxane of less than or equal to 10:90.

9. The coating composition of claim 1 wherein said composition is substantially free of polyorganosiloxanes including at least one silanol group.

* * * * *